US012382204B2

(12) United States Patent
Jenia et al.

(10) Patent No.: US 12,382,204 B2
(45) Date of Patent: Aug. 5, 2025

(54) MOUNT ASSEMBLY

(71) Applicant: MS Electronics LLC, Lenexa, KS (US)

(72) Inventors: Michael Jenia, Leawood, KS (US); Shannon Humphrey, Ottawa, KS (US); Ken Hecht, Jacksonville, FL (US)

(73) Assignee: MS Electronics LLC, Lenexa, KS (US)

( * ) Notice: Subject to any disclaimer, the term of this patent is extended or adjusted under 35 U.S.C. 154(b) by 204 days.

(21) Appl. No.: 18/350,193

(22) Filed: Jul. 11, 2023

(65) Prior Publication Data

US 2025/0024181 A1 Jan. 16, 2025

(51) Int. Cl.
*H04R 1/02* (2006.01)

(52) U.S. Cl.
CPC .................................... *H04R 1/02* (2013.01)

(58) Field of Classification Search
CPC .......... H04R 1/026; H04R 1/025; H04R 1/02; H04R 2201/021; H04R 2201/029; H04R 1/345; H04R 2499/15; H04R 1/2873; F16M 13/027; F16M 13/022; F21V 21/047; F16B 2/185; F16B 2/04; H02G 3/20; H02G 3/123; Y10S 248/916; H04N 5/642; G06F 1/1605; B25B 13/46
USPC .......................... 381/386–387, 182, 368, 87
See application file for complete search history.

(56) References Cited

U.S. PATENT DOCUMENTS

| | | | | |
|---|---|---|---|---|
| 2005/0072891 A1* | 4/2005 | Wright | H04R 1/025 | 248/342 |
| 2011/0017889 A1* | 1/2011 | Nelson | H04R 1/026 | 248/229.23 |
| 2012/0002835 A1* | 1/2012 | Stewart, Jr. | H04R 1/025 | 381/386 |
| 2016/0366501 A1* | 12/2016 | Ivey | H04R 1/026 | |
| 2021/0076515 A1* | 3/2021 | Mai | H05K 5/0204 | |

OTHER PUBLICATIONS

MSE Audio, MSE Audio Technology: SoundTube Speedwings™, Webpage <https://mseaudio.com/blog/SoundTube-Speedwings.html>, Mar. 3, 2022, 6 pages.

* cited by examiner

*Primary Examiner* — Carolyn R Edwards
*Assistant Examiner* — Julie X Dang
(74) *Attorney, Agent, or Firm* — HOVEY WILLIAMS LLP

(57) ABSTRACT

A mount assembly for mounting a device in an opening of a mounting structure having a rear surface, the mount assembly comprising a shaft and right and left wings. The shaft is rotatably connected to the device and includes an outer surface and a number of grooves each extending radially around a portion of the outer surface. The wings are pivotably linked to and extend laterally from the shaft. A first tab of one of the wings is configured be unengaged from the grooves when the shaft is rotated from a first position to a second position so that the first and second wings are free to move longitudinally relative to the shaft. The shaft is configured to engage the first tab via one of the grooves when the shaft is rotated back to the first position to urge the first and second wings against the rear surface.

20 Claims, 12 Drawing Sheets

MOUNT ASSEMBLY

BACKGROUND

Speakers, lights, cameras, sensors, control panels, and other devices are often mounted in walls, ceilings, and other surfaces via unsightly fasteners or other cumbersome mounting hardware. This requires hand tools or power tools and often damages mounting surfaces. In some cases, the device being mounted must be leveled or aligned with other structures for functional and/or aesthetic purposes. Some mount assemblies are retained against mounting surfaces via wing components, but they must be tightened to an uncertain torque, which can damage the mount assemblies or mounting surfaces. Furthermore, installers frequently assume an incorrect tightening direction (perhaps due to disorientation when installing in awkward positions), which can also damage the mount assemblies or the mounting surfaces.

SUMMARY

Embodiments of the invention solve the above-mentioned problems and other problems by providing a distinct advance in the art of surface mounting assemblies. More particularly, the invention provides a self-contained mount assembly for mounting a device to a generally flat mounting structure without tools or additional fasteners via simple, discrete installation actions.

An embodiment of the mount assembly broadly comprises an alignment bracket, a shaft, a bushing, opposing right and left wings, a pivotal biasing element, a translational biasing element, and a lever. The mount assembly may be used for mounting a device in a surface opening of a generally flat mounting structure.

The alignment bracket is configured to be attached to the device and includes an alignment tab and right and left guides. The alignment bracket may be a bent-metal or molded plastic component or may be integrated with the device.

The alignment tab includes an alignment hole for receiving at least a portion of the shaft therein. The right and left guides are configured to urge the right and left wings in rotational directions away from the device during installation.

The shaft is aligned between the alignment hole of the alignment tab of the alignment bracket and a mount assembly hole of a forward flange of the device. The shaft includes an outer surface, a number of grooves, a notch, and a longitudinal channel. The shaft is configured to rotate axially.

The grooves are aligned with each other and longitudinally spaced from each other in the outer surface. Each groove extends substantially annularly around a portion of the outer surface and includes a first downward slanted portion and a second portion adjacent the first portion.

The bushing is aligned axially on the shaft in pivot holes of the right and left wings. To that end, the bushing includes a lower flange to retain the right and left wings on the bushing. The bushing also includes a slot for allowing the plunger to engage the shaft.

The opposing right and left wings are pivotably linked to the shaft and extend laterally from the shaft in opposite directions. The right wing includes pivot holes, a first tab, a distal anchor tab, and a number of proximal anchor tabs. The pivot holes receive the shaft and bushing therethrough. The first tab is initially entrained in the notch of the shaft and is configured to be shifted to one of the grooves via the longitudinal channel. The distal anchor tab and the proximal anchor tabs are configured to engage a rear surface of the mounting structure.

The left wing includes pivot holes for receiving the shaft and bushing therethrough and a distal anchor tab and a number of proximal anchor tabs configured to engage the rear surface of the mounting structure. The left wing is offset from the right wing slightly so that both the right and left wings can be pivotably linked to the shaft.

The pivotal biasing element is wrapped around the shaft in line with the right and left wings and includes opposing ends configured to engage the first and second wings. The pivotal biasing element may be a torsion spring, a leaf spring, an elastic component, or the like.

The translational biasing element is wrapped around the shaft between the right and left wings and the alignment tab of the alignment bracket. The translational biasing element may be a coil spring, a leaf spring, an elastic band, an elastic component, or the like.

The lever is connected to the shaft near a front of the device so that pivoting of the lever results in rotation of the shaft. The lever is accessible to and grippable by an installer when the device is positioned in the surface opening.

In use, the device is first inserted into the surface opening such that a forward flange of the device abuts a forward surface of the mounting structure. To facilitate this, the pivotal biasing element urges the right and left wings toward a retracted position so that they fit through the surface opening. At this point, the shaft is in a first position with the first tab entrained in the notch, thereby retaining the right and left wings in the retracted position.

The lever is then pivoted to rotate the shaft from the first position to the second position so that the first tab is in the longitudinal channel of the shaft. The right and left wings are in turn free to move longitudinally relative to the shaft. The translational biasing element urges the right and left wings along the shaft in a longitudinal direction toward the rear surface of the mounting structure.

The right and left guides also urge the right and left wings away from the device as the right and left wings move longitudinally along the shaft. Specifically, the right guide pivots the right wing in a first rotational direction and the left guide pivots the left wing in a second rotational direction opposite the first rotational direction relative to the shaft.

The translational biasing element continues to urge the right and left wings along the shaft with the right and left wings being pivoted outward from the device so that the distal anchor tabs and the proximal anchor tabs of the right and left wings engage the rear surface of the mounting structure. The right and left wings are now considered to be in a deployed position. At this point, the first tab should be near one of the grooves.

The lever is then pivoted in reverse to rotate the shaft from the second position to the first position. The shaft thereby engages the first tab via the nearby groove. The first portion of the nearby groove, being slanted downward (i.e., a first slant direction), further urges the right and left wings against the rear surface of the mounting structure via the plunger. The second portion of the nearby groove may positively lock the right and left wings against the rear surface via the first tab so that the device is secured in the surface opening.

The above-described mount assembly provides several advantages. For example, installing a speaker into a ceiling via the mount assembly does not require any tools. Installation also only requires two simple, discrete actions: pivoting the lever in one direction and pivoting the lever in a reverse direction. The installer does not need to tighten the shaft to an uncertain torque and does not need to guess or assume which way the shaft needs to be rotated. The shaft can be injection molded, which can reduce cost. Furthermore, the mount assembly may be preloaded (via the notch in the shaft), so that the installer does not need to assemble or load components before installation. This saves significant time during installation and prevents incorrect or improper installation.

The mount assembly can be used for mounting a speaker, a light, a camera, a sensor, a control panel, or any other fixture in an opening of a mounting structure such as a ceiling, a wall, a floor, or the like. To that end, the mount assembly can be used in any orientation. The mount assembly can also be used in mounting structure having a wide range of thicknesses such as from approximately 0.25 inches to 3 inches.

The distal anchor tabs and the proximal anchor tabs of the right and left wings extend toward the speaker, which prevents them from catching on the ceiling if the speaker is removed from the ceiling. The proximal anchor tabs minimize torque on the right and left wings due to the shorter moment arms from the shaft to the proximal anchor tabs.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
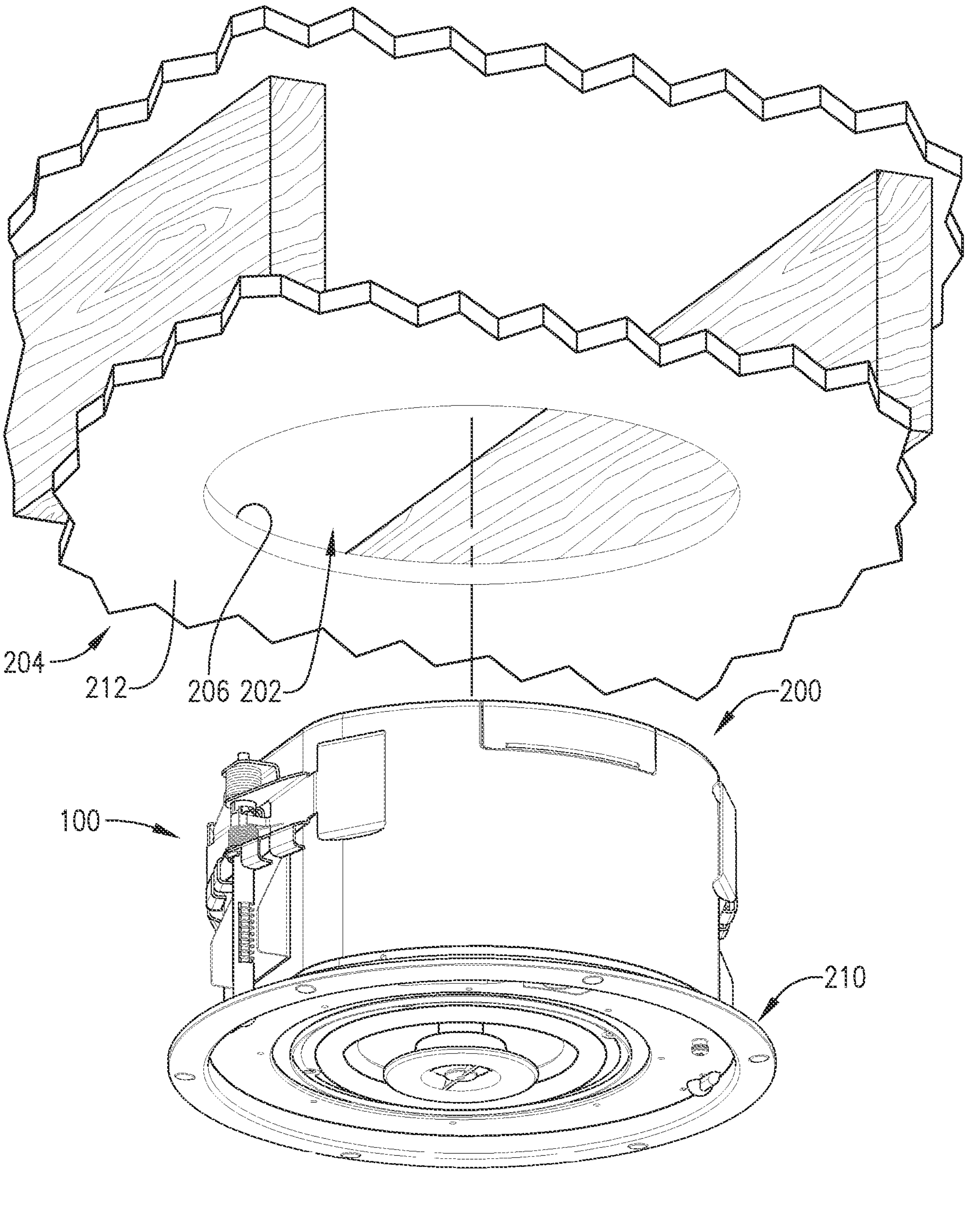
FIG. 1 is a perspective view of a speaker and mount assembly constructed in accordance with an embodiment of the invention.
Figure 8A:
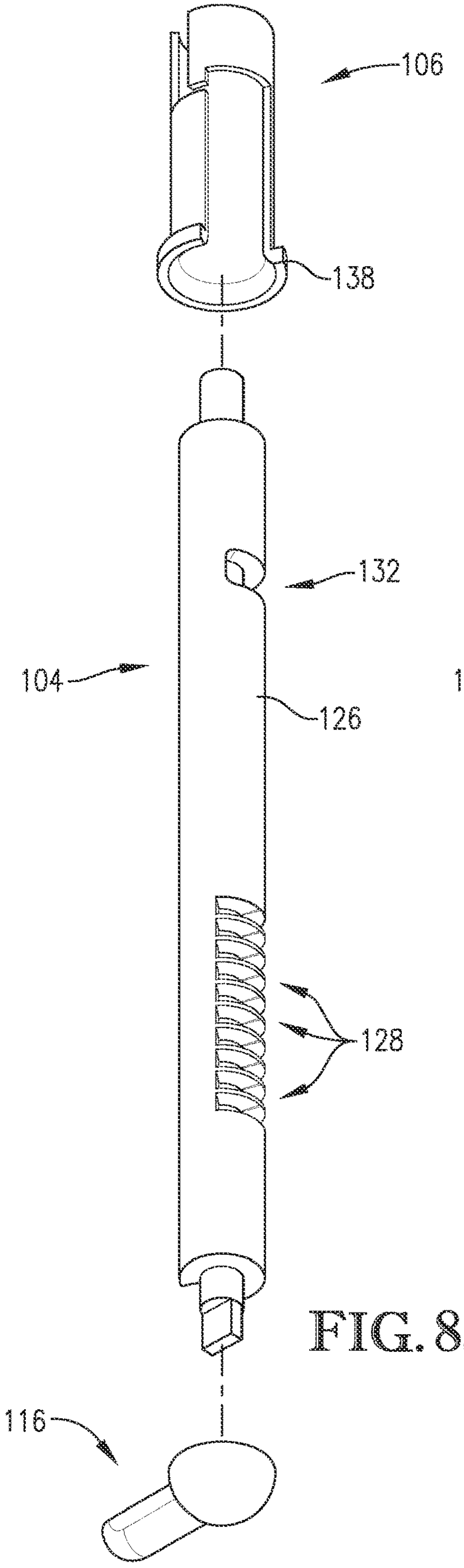
Figure 8B:
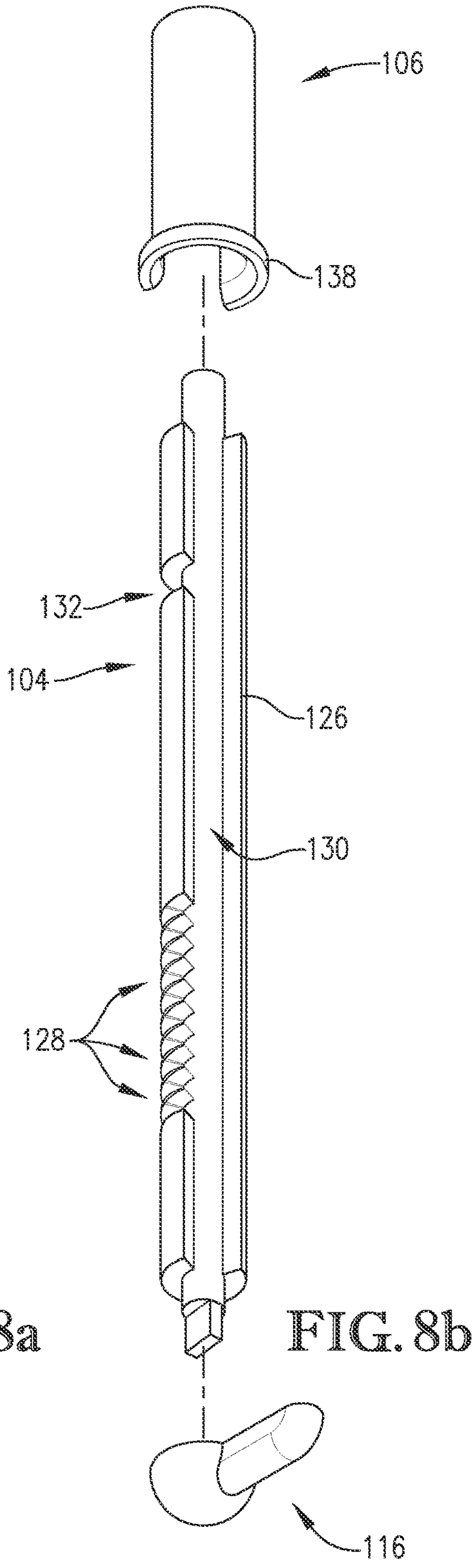
Figure 9:
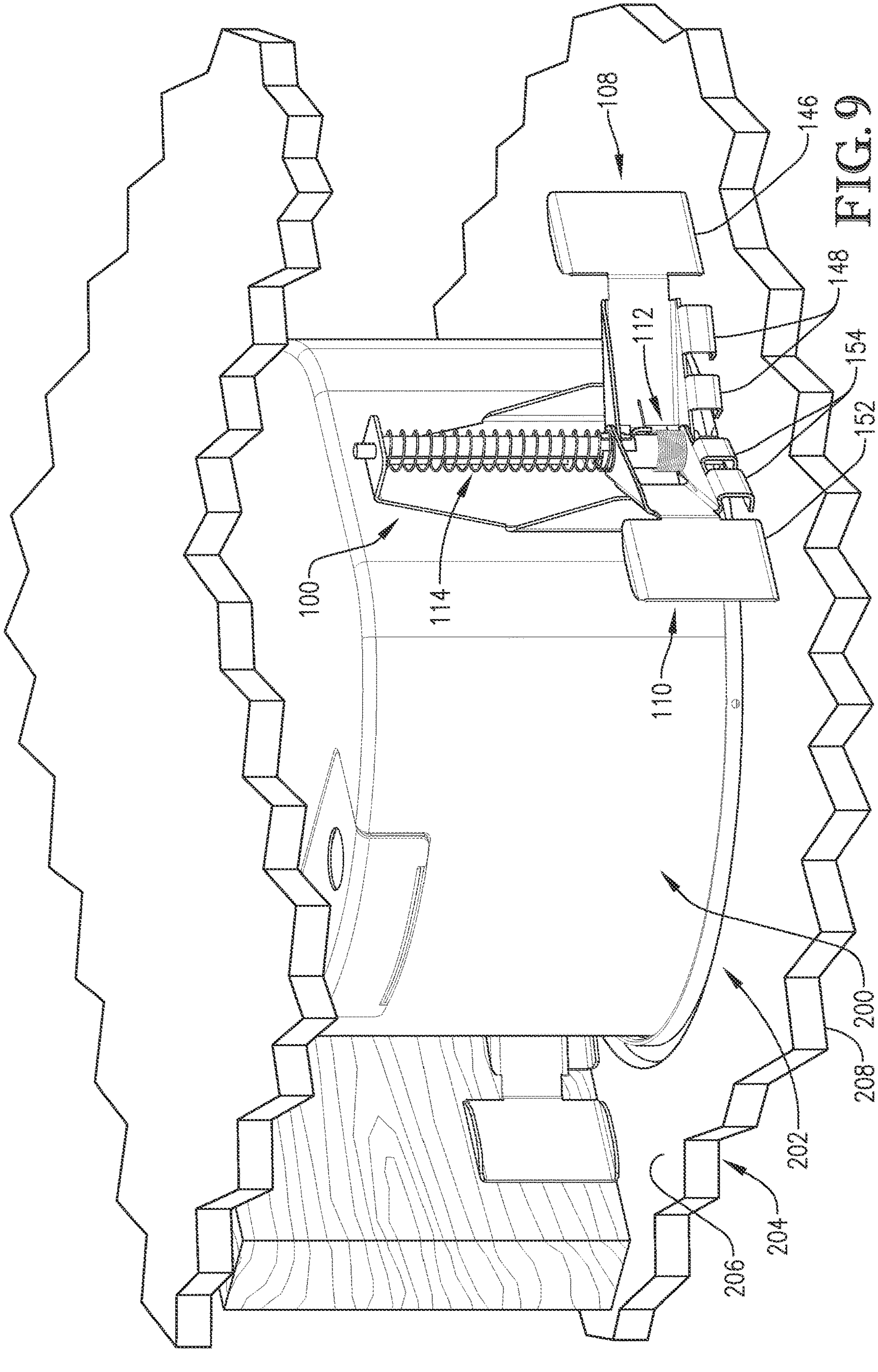
Figure 10:
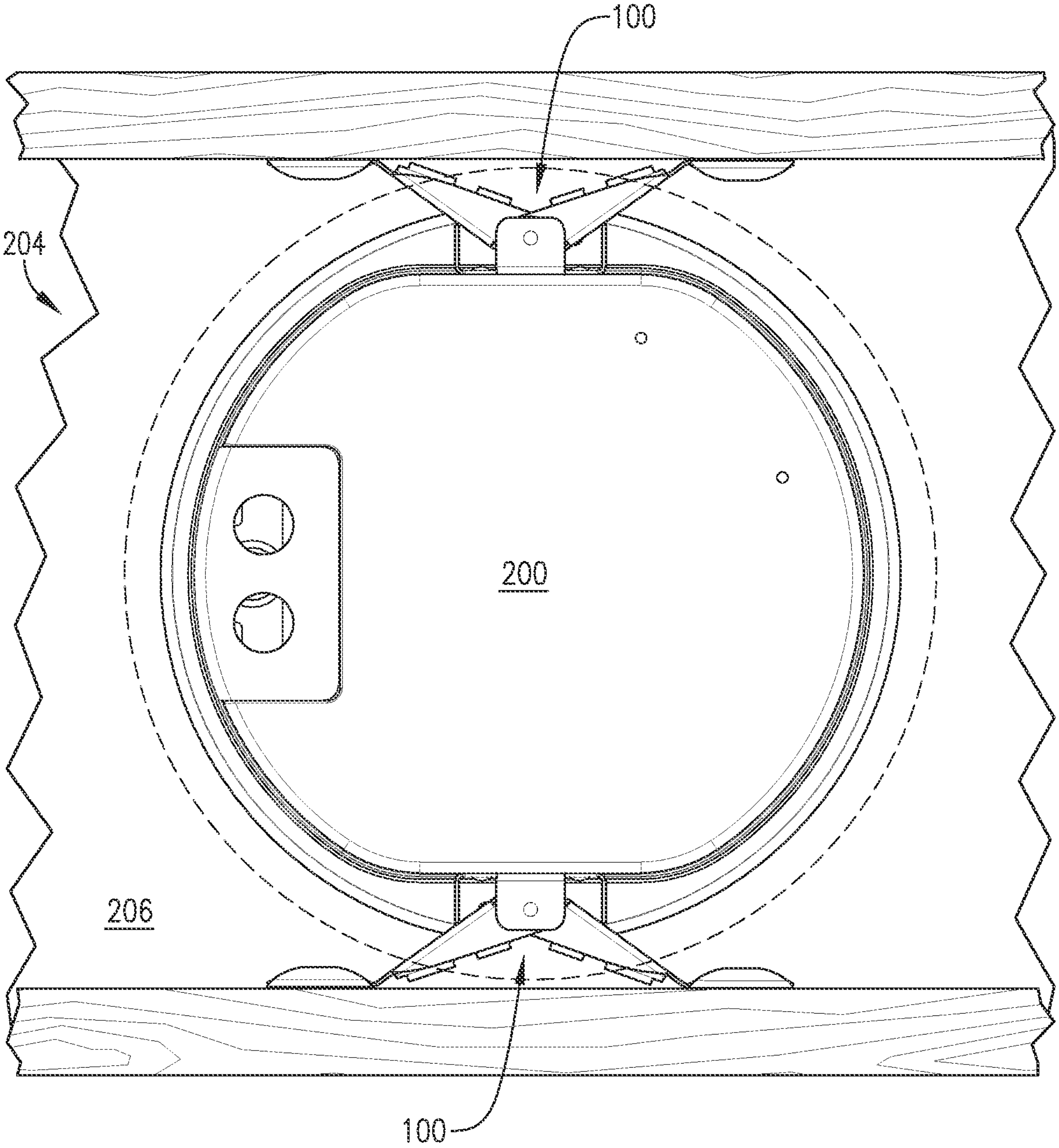
Figure 11:
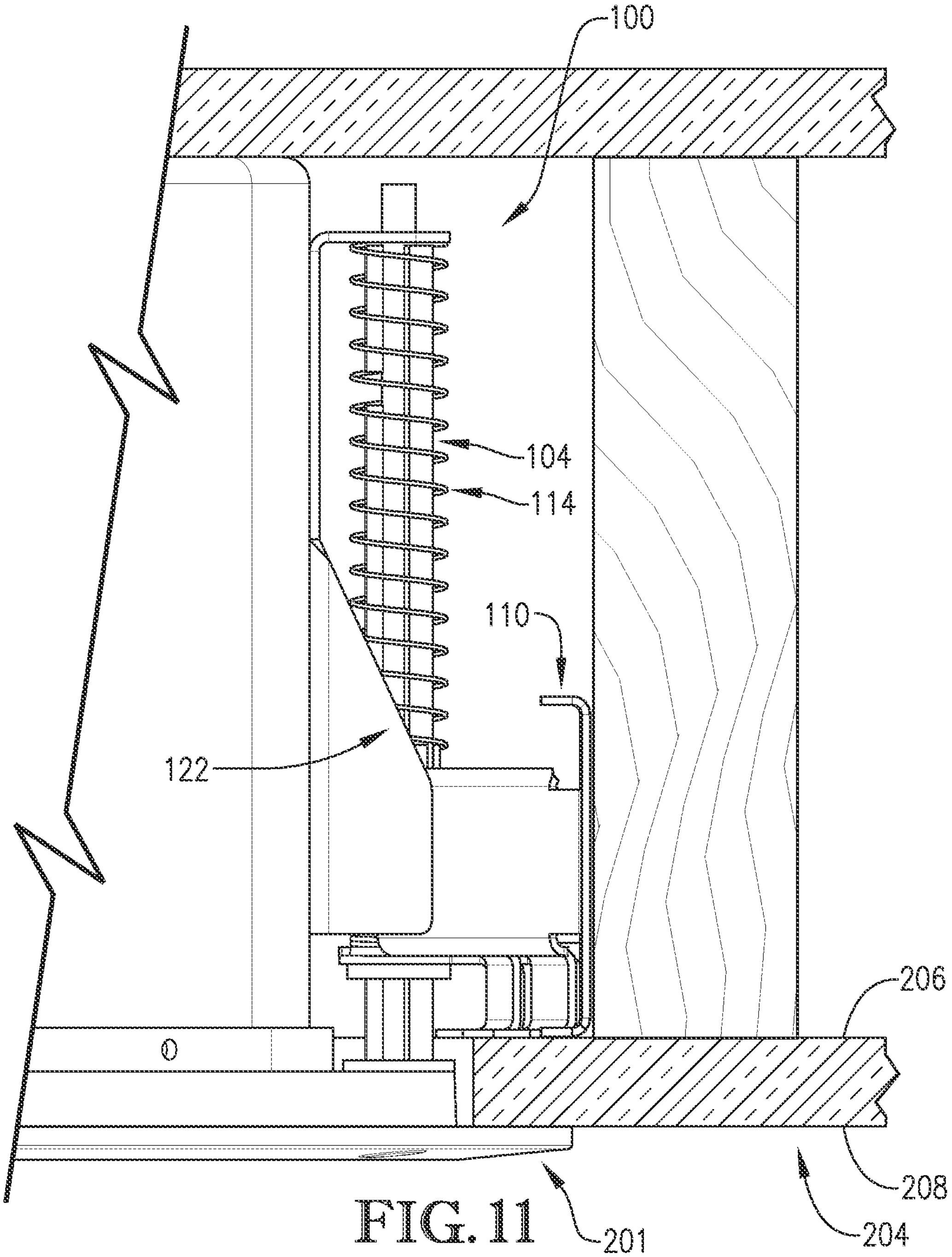

FIG. 8*a* is an exploded perspective view of certain components of the mount assembly of FIG. 1;

FIG. 8*b* is an exploded perspective view of certain components of the mount assembly of FIG. 1;

FIG. 9 is a perspective view of the speaker and mount assembly of FIG. 1;

FIG. 10 is a plan view of the speaker and mount assembly of FIG. 1;

FIG. 11 is an elevation view of the mount assembly of FIG. 1; and

Figure 12:
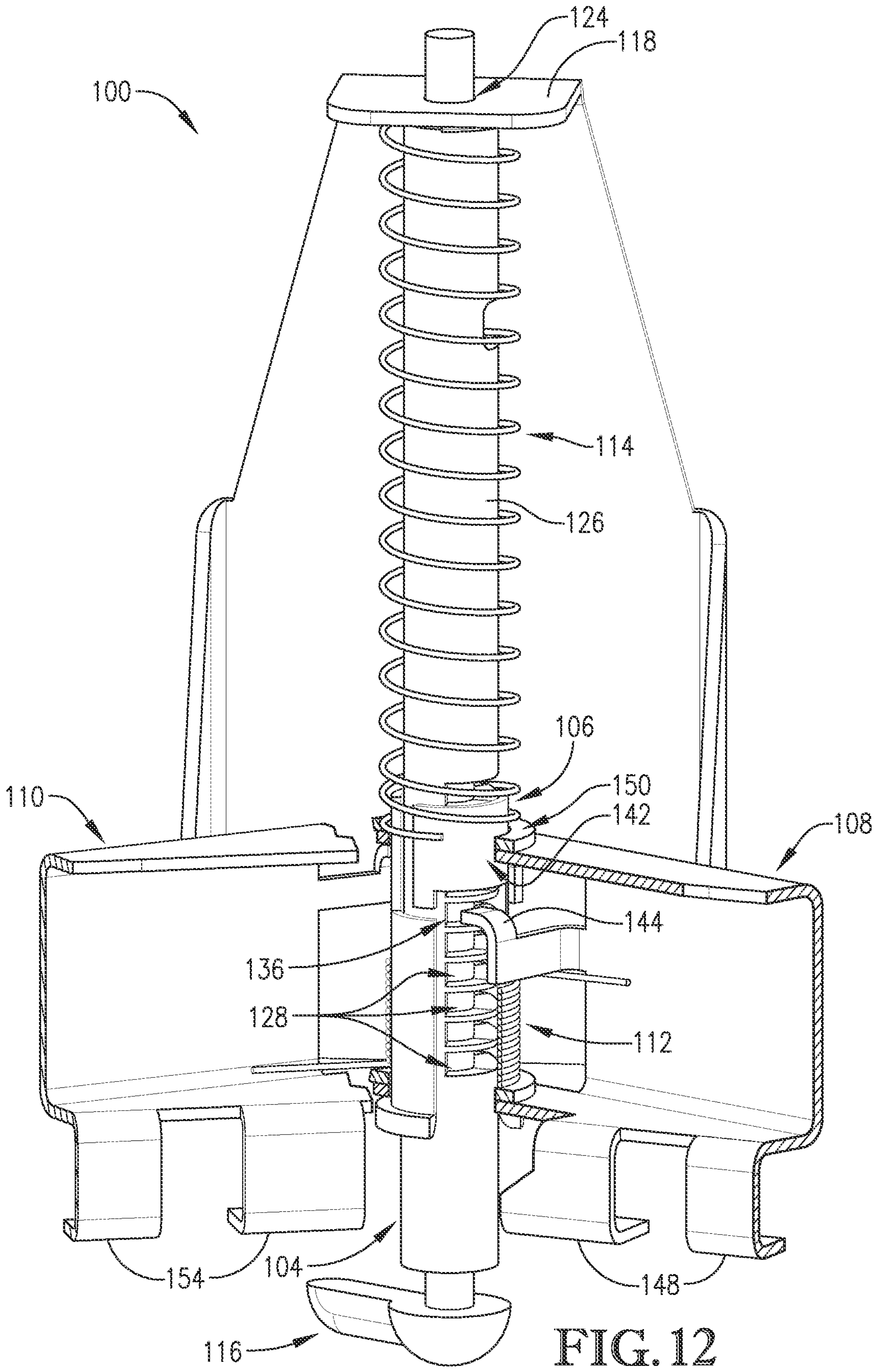

FIG. 12 is a perspective view of certain components of the mount assembly of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, a mount assembly 100 constructed in accordance with an embodiment of the invention is illustrated. The mount assembly 100 is shown supporting a speaker 200 in a surface opening 202 of a ceiling 204. Additional mount assemblies may be used for additional or symmetrical support. The mount assembly 100 broadly comprises an alignment bracket 102, a shaft 104, a bushing 106, opposing right and left wings 108, 110, a pivotal biasing element 112, a translational biasing element 114, and a lever 116.

The alignment bracket 102 may be attached to the speaker 200 and may include an alignment tab 118 and right and left guides 120, 122. The alignment bracket 102 may be a bent-metal or molded plastic component or may be integrated with the speaker 200.

The alignment bracket 102 may be attached to the speaker 200 and may include an alignment tab 118 and right and left guides 120, 122. The alignment bracket 102 may be a bent-metal or molded plastic component or may be integrated with the speaker 200.

The right and left guides 120, 122 may be laterally spaced from each other and are inclines or wedges configured to urge the right and left wings 108, 110 in rotational directions away from the speaker 200 as discussed in more detail below. To that end, the right and left guides 120, 122 may be substantially identical to each other. The left and right guides 120, 122 may also be considered a guide collectively or alternatively a single guide may be used.

The shaft 104 may be aligned between an alignment hole 124 of the alignment tab 118 of the alignment bracket 102 and a mount assembly hole 208 of a forward flange 210 of the speaker 200. The shaft 104 may include an outer surface 126, a plurality of grooves 128, a longitudinal channel 130, and a notch 132. The shaft 104 may be configured to rotate axially relative to the speaker 200.

The plurality of grooves 128 may be aligned with each other and longitudinally (in terms of the shaft 104) spaced from each other in the outer surface 126. Each groove 128 extends substantially circumferentially around a portion of the outer surface 126 and includes a first portion 134 and a second portion 136. The first portion 134 may be angled diagonally downward, while the second portion 136 is connected to the first portion 134 and may be horizontal or angled diagonally upward so that the first portion 134 and second portion 136 cooperatively form a shallow V shape.

The longitudinal channel 130 extends at least between the notch 132 and the plurality of grooves 128. In this way, the notch 132 and plurality of grooves 128 are connected and form a unified pathway for the first tab described below.

The notch 132 may be spaced from the plurality of grooves 128 and connected thereto via the longitudinal channel 130. The notch 132 initially receives the first tab described below.

The bushing 106 is aligned axially on the shaft 104 in pivot holes of the right and left wings 108, 110. To that end, the bushing 106 may include a lower flange 138 to retain the right and left wings 108, 110 on the bushing 106. The bushing 106 also includes a slot 140 for allowing the first tab described below to engage the shaft 104.

The opposing right and left wings 108, 110 are pivotably linked to the shaft 104 and extend laterally from the shaft 104 in opposite directions. The right wing 108 may include pivot holes 142, a first tab 144, a distal anchor tab 146, and a plurality of proximal anchor tabs 148A,B. The pivot holes 142 receive the shaft 104 and bushing 106 therethrough.

The first tab 144 may initially be entrained in the notch 132 of the shaft 104. The first tab 144 is configured to be shifted to one of the plurality of grooves 128 via the longitudinal groove 128. The first tab 144 may be formed of a plurality of material bends.

The distal anchor tab 146 is configured to engage a rear surface 206 of the ceiling 204 when the wings 108, 110 are deployed. The distal anchor tab 146 may extend toward the speaker 200 (i.e., away from the ceiling 204), which prevents the distal anchor tab 146 from catching on the ceiling 204 during removal of the speaker 200 from the ceiling 204.

The plurality of proximal anchor tabs 148A, B are spaced between the pivot holes 142 (and hence the shaft 104) and the distal anchor tab 146. The plurality of proximal anchor tabs 148A, B are configured to engage the rear surface 206 of the ceiling 204 nearer to the shaft 104 when the wings 108, 110 are deployed. The plurality of proximal anchor tabs 148A, B minimize torque on the right wing 108 due to the shorter moment arm from the shaft 104 to the proximal anchor tabs 148A, B. Similar to the distal anchor tab 146, the proximal anchor tabs 148A,B extend toward the speaker 200 (i.e., away from the ceiling 204), which prevents the proximal anchor tabs 148A,B from catching on the ceiling 204 during removal of the speaker 200 from the ceiling 204.

The left wing 110 may be substantially similar to the right wing 108 and may include pivot holes 150, a second tab 152, a distal anchor tab 154, and a plurality of proximal anchor tabs 156A,B. The left wing 110 extends laterally from the shaft 104 opposite the right wing 108 and may be offset from the right wing 108 slightly so that both the right and left wings 108, 110 can be pivotably linked to the shaft 104. The pivot holes 150 receive the shaft 104 and bushing 106 therethrough.

The second tab 152 is configured to, at least in an initial configuration, engage the left wing 110 with the right wing 108 to keep the wings 108, 110 substantially adjacent to each other. The second tab 152 may be formed via a material bend.

The distal anchor tab 154 is configured to engage the rear surface 206 of the ceiling 204 when the wings 108, 110 are deployed. The distal anchor tab 154 may extend toward the speaker 200 (i.e., away from the ceiling 204), which prevents the distal anchor tab 154 from catching on the ceiling 204 during removal of the speaker 200 from the ceiling 204.

The plurality of proximal anchor tabs 156A, B are spaced between the pivot holes 150 (and hence the shaft 104) and the distal anchor tab 154. The plurality of proximal anchor tabs 156A, B are configured to engage the rear surface 206 of the ceiling 204 nearer to the shaft 104 when the wings 108, 110 are deployed. The plurality of proximal anchor tabs 156A,B minimize torque on the left wing 110 due to the shorter moment arm from the shaft 104 to the proximal anchor tabs 156A, B. Similar to the distal anchor tab 154, the proximal anchor tabs 156A, B extend toward the speaker 200 (i.e., away from the ceiling 204), which prevents the proximal anchor tabs 156A,B from catching on the ceiling 204 during removal of the speaker 200 from the ceiling 204.

The pivotal biasing element 112 may be wrapped around the shaft 104 in line with the right and left wings 108, 110 and may include opposing ends configured to engage the right and left wings 108, 110. The pivotal biasing element 112 may be a torsion spring, a leaf spring, an elastic component, or the like.

The translational biasing element 116 may be wrapped around the shaft 104 between the right and left wings 108, 110 and the alignment tab 118 of the alignment bracket 102. The translational biasing element 116 may be a coil spring, a leaf spring, an elastic band, an elastic component, or the like.

The lever 118 may be connected to the shaft 104 near a front of the speaker 200 and accessible to an installer when the speaker 200 is positioned in the surface opening 202, so that pivoting of the lever 118 results in rotation of the shaft 104. The lever 118 may be a separate component or may be an integral part of the shaft 104.

Figure 2:
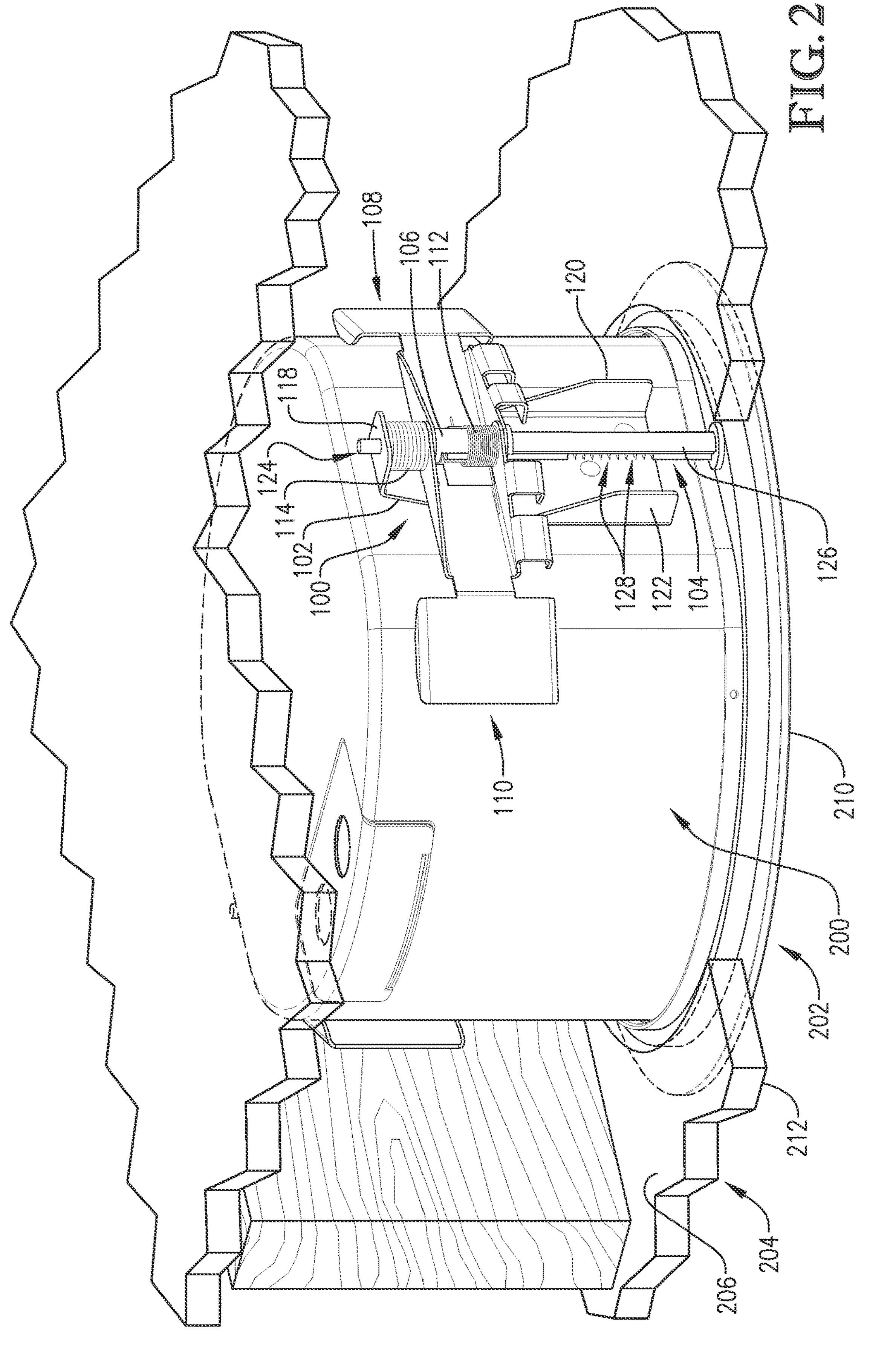
FIG. 2 is another perspective view of the speaker and mount assembly of FIG. 1.
Figure 3:
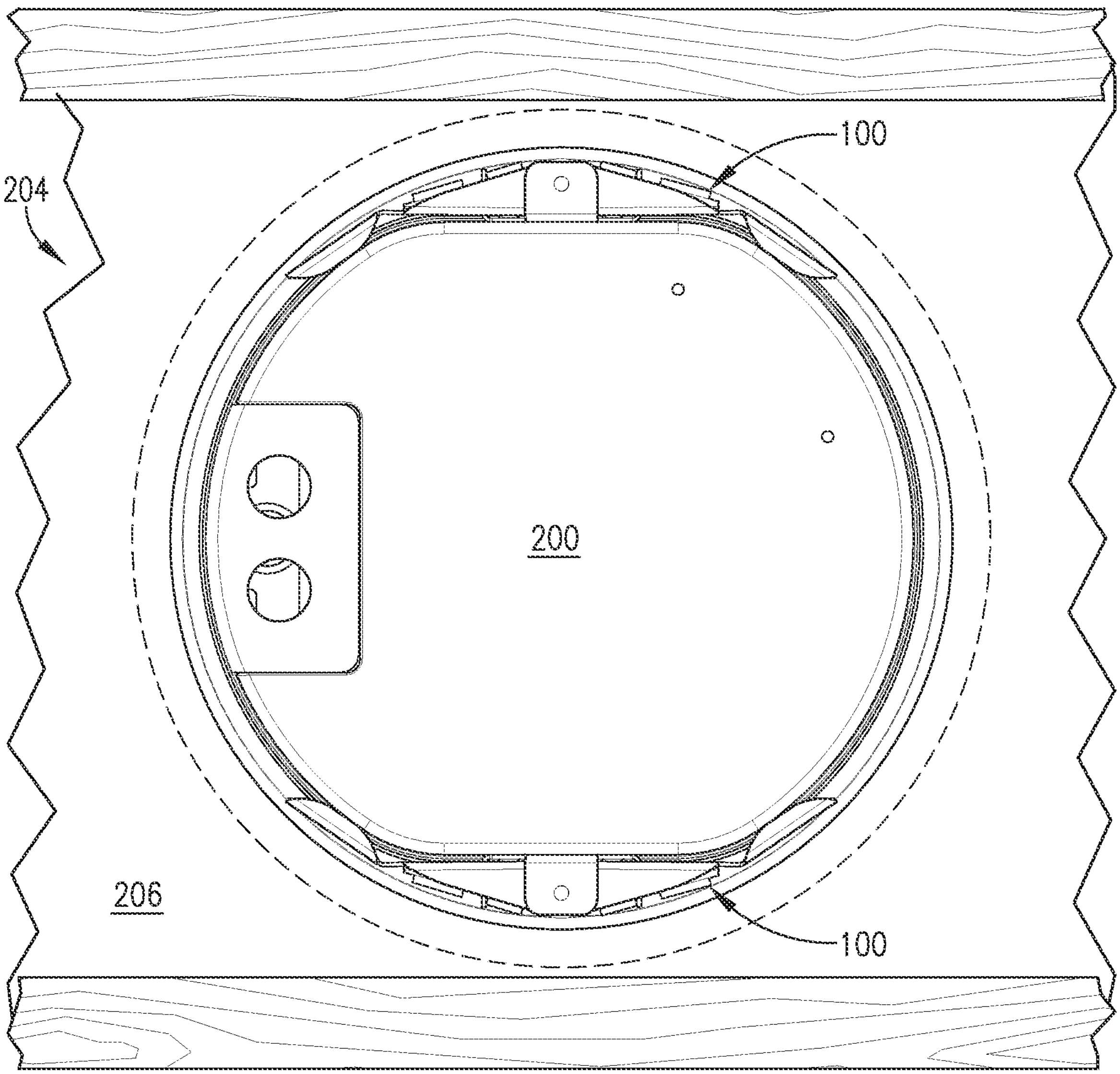
FIG. 3 is a plan view of the speaker and mount assembly of FIG. 1.
Figure 4:
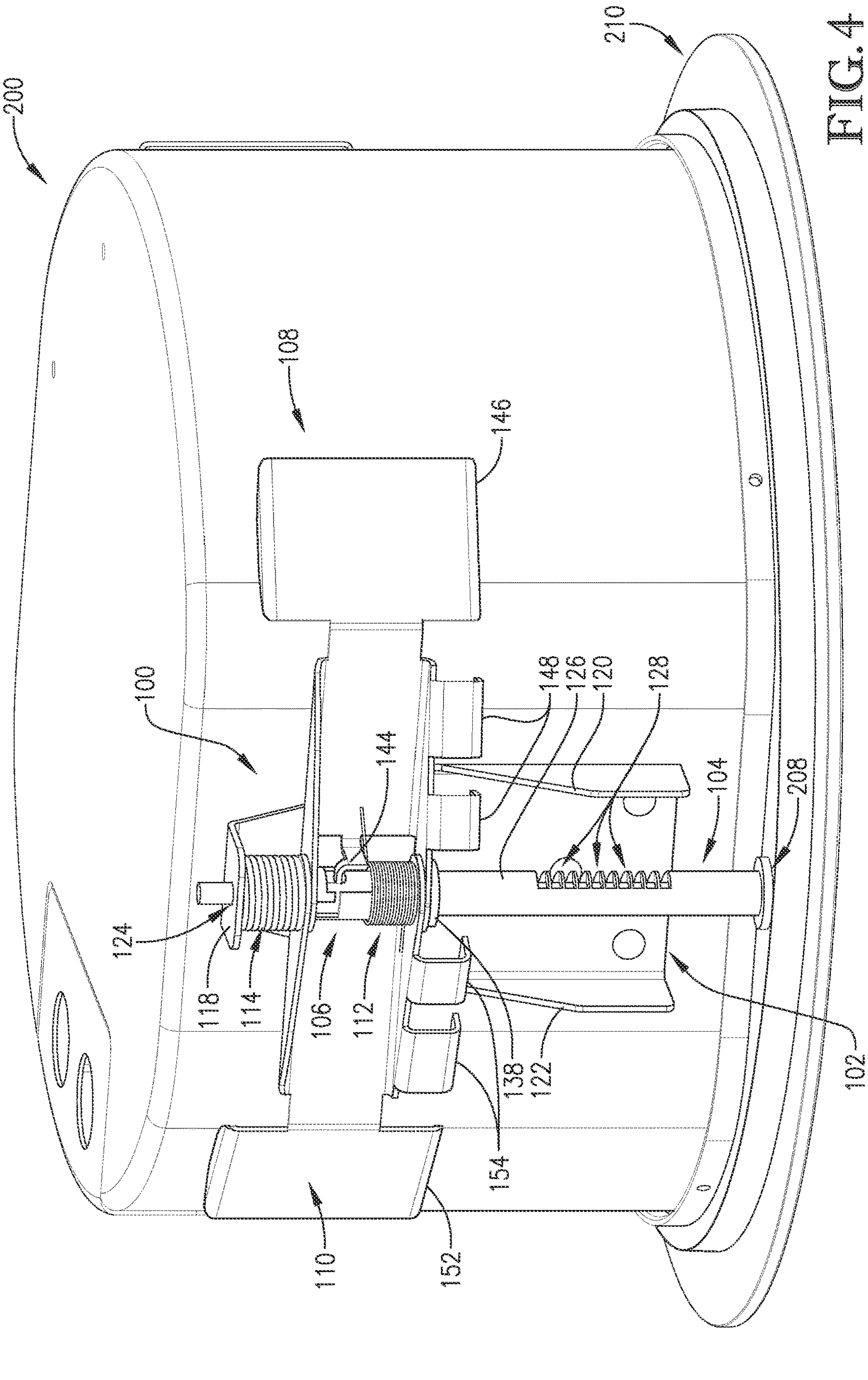
FIG. 4 is a perspective view of the speaker and mount assembly of FIG. 1.
Figure 5:
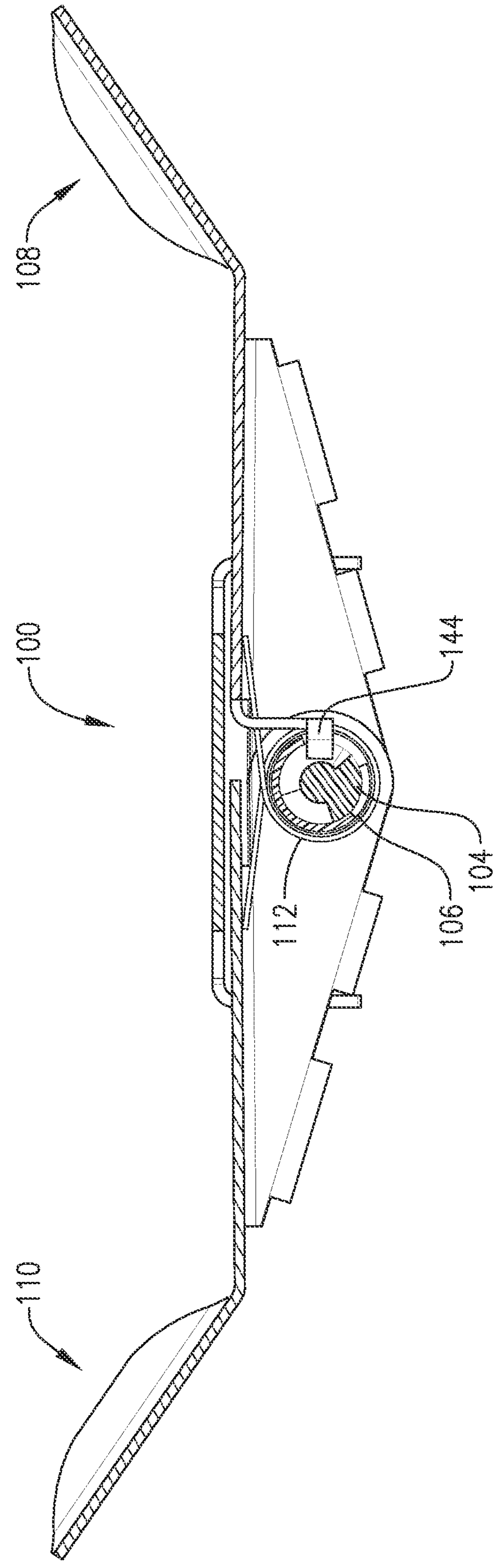
FIG. 5 is a plan view of the mount assembly of FIG. 1.

Use of the above-described mount assembly 100 will now be described in more detail. First, the speaker 200 may be inserted into the surface opening 202 such that the forward flange 210 of the speaker 200 abuts a forward surface 212 of the ceiling 204, as seen in FIG. 2. To facilitate this, the pivotal biasing element 112 urges the right and left wings 108, 110 toward a retracted position so that they fit through the surface opening 202. Specifically, the pivotal biasing element 112 urges the left wing 110 in a first rotational direction and urges the right wing 108 in a second rotational direction opposite the first rotational direction relative to the shaft 104. At this point, the shaft 104 is in a first position with the first tab 144 entrained in the notch 132, thereby retaining the right and left wings 108, 110 in the retracted position.

Figure 6:
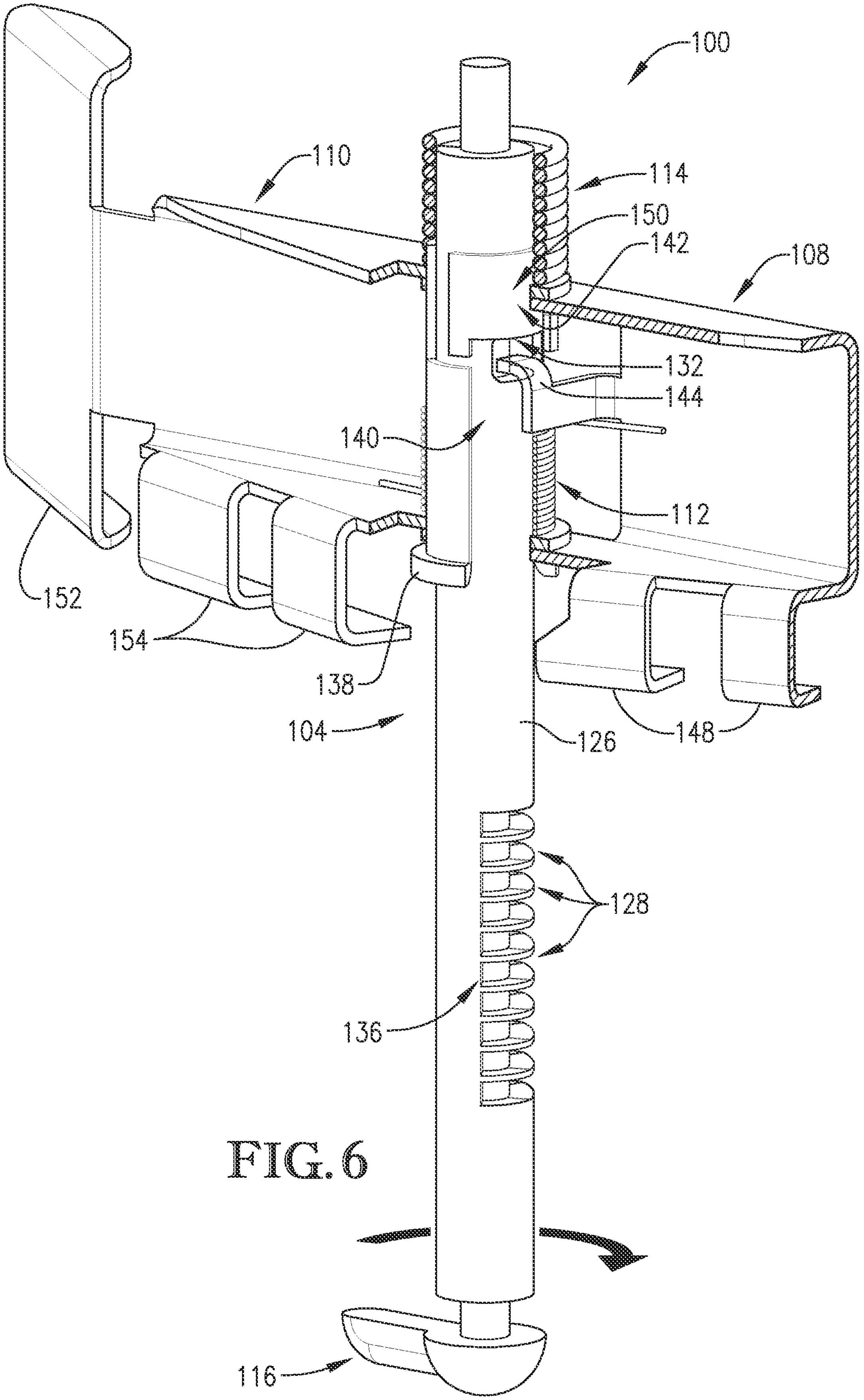
FIG. 6 is a perspective view of certain components of the mount assembly of FIG. 1.
Figure 7:
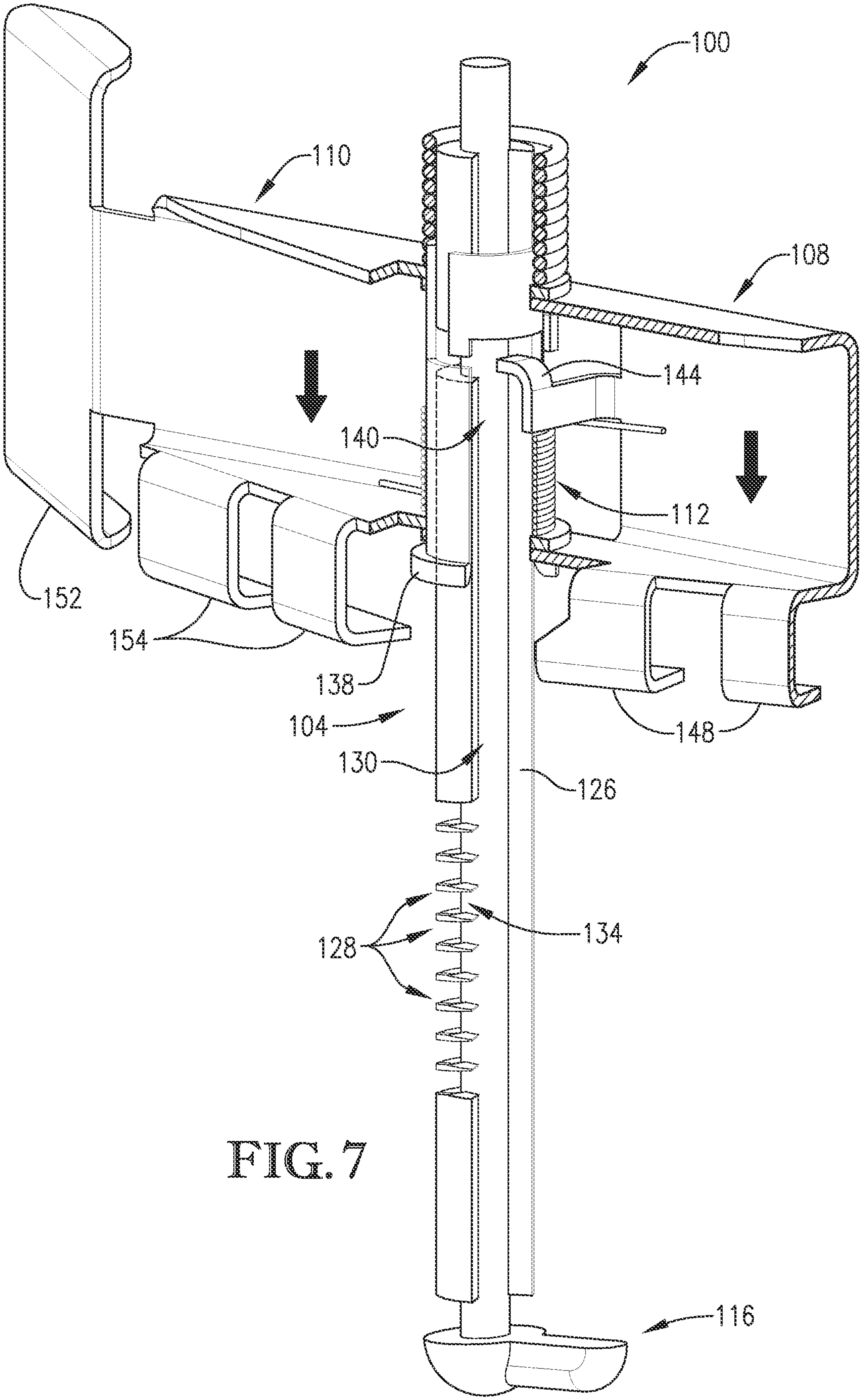
FIG. 7 is a perspective view of certain components of the mount assembly of FIG. 1.

The lever 118 may then be pivoted (as seen in FIG. 6) to rotate the shaft 104 from the first position to the second position so that the first tab 144 is freed from the notch 132 and enters the longitudinal channel 130. The right and left wings 108, 110 (and the bushing 106) are in turn free to move longitudinally relative to the shaft 104 with the first tab 144 in the longitudinal channel 130, as seen in FIG. 7. The translational biasing element 116 may urge the right and left wings 108, 110 along the shaft 104 in a longitudinal direction toward the rear surface 206 of the ceiling 204, as seen in FIG. 9.

The right and left guides 120, 122 also urge the right and left wings 108, 110 away from the speaker 200 as the right and left wings 108, 110 move longitudinally along the shaft 104. Specifically, the right guide 120 pivots the right wing 108 in the first rotational direction and the left guide 122 pivots the left wing 110 in the second rotational direction opposite the first rotational direction relative to the shaft 104.

The translational biasing element 116 continues to urge the right and left wings 108, 110 along the shaft 104 with the right and left wings 108, 110 being pivoted outward from the speaker 200 so that the distal anchor tabs 146, 154 and the proximal anchor tabs 148A, B, 156A, B of the right and left wings 108, 110 engage the rear surface 206 of the ceiling 204, as seen in FIGS. 9-11. The right and left wings 108, 110 are now considered to be in a deployed position. At this point, the first tab 144 should be near one of the grooves 128. Which groove 128 the plunger 112 is near is dictated by a thickness of the ceiling 204 and possibly other factors.

The lever 118 may then be pivoted in reverse to rotate the shaft 104 from the second position to the first position. The shaft 104 thereby engages the first tab 144 via the nearby groove 128, as seen in FIG. 12. The first portion 134 of the nearby groove 128, being slanted downward (i.e., a first slant direction), may further urge the right and left wings 108, 110 against the rear surface 206 of the ceiling 204 via the plunger 112. The second portion 136 of the nearby groove 128 is shown without slant but it may be slanted upward (i.e., a second slant direction) to positively lock the right and left wings 108, 110 against the rear surface 206 via the plunger 112. That is, the first tab 144 would need to overcome a reactionary force to be drawn out of the second portion 136 of the nearby groove 128. The speaker 200 is thereby secured in the surface opening 202.

The above-described mount assembly 100 provides several advantages. For example, installing a speaker into a ceiling via the mount assembly 100 does not require any tools. Installation also only requires two simple, discrete actions: pivoting the lever 118 in one direction and pivoting the lever in a reverse direction. The installer does not need to tighten the shaft 104 to an uncertain torque and does not need to guess or assume which way the shaft needs to be rotated. The shaft 104 can be injection molded, which can reduce cost. Furthermore, the mount assembly 100 may be preloaded (via the notch 132 in the shaft 104), so that the installer does not need to assemble or load components before installation. This saves significant time during installation and prevents incorrect or improper installation.

The mount assembly 100 can be used for mounting a speaker, a light, a camera, a sensor, a control panel, or any other fixture in an opening of a mounting structure such as a ceiling, a wall, a floor, or the like. To that end, the mount assembly 100 can be used in any orientation. The mount assembly 100 can also be used in mounting structure having a wide range of thicknesses such as from approximately 0.25 inches to 3 inches.

The distal anchor tabs 146, 154 and the proximal anchor tabs 148A,B, 156A, B of the right and left wings 108, 110 extend toward the speaker 200, which prevents them from catching on the ceiling 204 if the speaker 200 is removed from the ceiling 204. The proximal anchor tabs 148A, B, 156A, B minimize torque on the right and left wings 108, 110 due to the shorter moment arms from the shaft 104 to the proximal anchor tabs 148A,B, 156A,B.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A mount assembly for mounting a device in an opening of a mounting structure, the mounting structure having a rear surface, the mount assembly comprising:
- a substantially cylindrical shaft configured to rotatably engage the device, the shaft including an outer surface and a plurality of grooves each extending annularly around a portion of the outer surface;
- a first wing pivotably linked to and extending laterally from the shaft, the first wing including a first tab extending toward the shaft; and
- a second wing pivotably linked to the shaft and extending laterally from the shaft opposite the first wing,
- the shaft being configured to engage the first tab via one of the plurality of grooves when the shaft is rotated to a first position to urge the first and second wings against the rear surface.

2. The mount assembly of claim 1, further comprising a guide configured to pivot the first wing in a first rotational direction and the second wing in a second rotational direction relative to the shaft as the first and second wings move in a first longitudinal direction relative to the shaft.

3. The mount assembly of claim 2, further comprising a first biasing element configured to urge the first wing in the second rotational direction and the second wing in the first rotational direction.

4. The mount assembly of claim 3, the first biasing element being a torsion spring wrapped around the shaft and including a first end configured to engage the first wing and a second end configured to engage the second wing.

5. The mount assembly of claim 1, each of the plurality of grooves including a first slanted portion and a second portion adjacent the first slanted portion, the shaft being configured to draw the first tab into the second portion via the first slanted portion.

6. The mount assembly of claim 1, further comprising a lever connected to the shaft and configured to be gripped by a user to rotate the shaft.

7. The mount assembly of claim 1, further comprising a second biasing element configured to urge the first and second wings in a first longitudinal direction.

8. The mount assembly of claim 7, further comprising an alignment bracket, the second biasing element being a compression spring wrapped around the shaft between one of the first and second wings and the alignment bracket.

9. The mount assembly of claim 1, the shaft further comprising a notch spaced from the plurality of grooves, the first tab being configured to initially be entrained in the notch.

10. The mount assembly of claim 9, the shaft further comprising a longitudinal channel extending between the notch and the plurality of grooves, the first tab being configured to shift from the notch to one of the plurality of grooves via the longitudinal channel.

11. The mount assembly of claim 1, the first wing and the second wing each including a distal anchor tab extending toward the device, the distal anchor tabs being configured to engage the rear surface.

12. The mount assembly of claim 11, the first wing and the second wing each including a proximal anchor tab extending toward the device between the shaft and the distal anchor tab, the proximal anchor tab being configured to engage the rear surface.

13. A mount assembly for mounting a speaker in an opening of a mounting structure, the speaker including a forward flange, the mounting structure having opposing forward and rear surfaces, the mount assembly comprising:

a shaft configured to rotatably engage the speaker, the shaft including an outer surface and a plurality of grooves each extending annularly around a portion of the outer surface;

a first wing pivotably linked to and extending laterally from the shaft, the first wing including a first tab extending toward the shaft; and a second wing pivotably linked to the shaft and extending laterally from the shaft opposite the first wing, the shaft being configured to engage the first tab via one of the plurality of grooves when the shaft is rotated to a first position to urge the first and second wings against the rear surface.

14. The mount assembly of claim 13, each of the plurality of grooves including a first slanted portion and a second portion adjacent the first slanted portion, the shaft being configured to draw the first tab into the second portion via the first slanted portion.

15. The mount assembly of claim 13, further comprising a lever connected to the shaft and configured to be gripped by a user to rotate the shaft.

16. The mount assembly of claim 13, the shaft further comprising a notch spaced from the plurality of grooves, the first tab being configured to initially be entrained in the notch.

17. The mount assembly of claim 16, the shaft further comprising a longitudinal channel extending between the notch and the plurality of grooves, the first tab being configured to shift from the notch to one of the plurality of grooves via the longitudinal channel.

18. The mount assembly of claim 13, the first wing and the second wing each including a distal anchor tab extending toward the device, the distal anchor tabs being configured to engage the rear surface.

19. The mount assembly of claim 18, the first wing and the second wing each including a proximal anchor tab extending toward the device between the shaft and the distal anchor tab, the proximal anchor tab being configured to engage the rear surface.

20. A mount assembly for mounting a device in an opening of a mounting structure, the mounting structure having a rear surface, the mount assembly comprising:

a shaft configured to rotatably engage the device, the shaft including:
- an outer surface;
- a plurality of grooves each extending annularly around a portion of the outer surface;
- a notch spaced from the plurality of grooves;
- a longitudinal channel extending between the notch and the plurality of grooves;

a first wing pivotably linked to and extending laterally from the shaft, the first wing including:
- a first tab extending toward the shaft;
- a distal anchor tab extending toward the device; and
- a proximal anchor tab extending toward the device between the shaft and the distal anchor tab of the first wing; and a second wing pivotably linked to the shaft and extending laterally from the shaft opposite the first wing, the second wing including:
- a distal anchor tab extending toward the device; and
- a proximal anchor tab extending toward the device between the shaft and the distal anchor tab of the second wing, the first tab being configured to initially be entrained in the notch and shift from the notch to the longitudinal channel when the shaft is rotated from a first position to a second position, the shaft being configured to engage the first tab via one of the plurality of grooves when the first and second wings have been longitudinally shifted toward the rear surface and the shaft is rotated from the second position to the first position to urge the first and second wings against the rear surface.

* * * * *